United States Patent
Aweya et al.

(10) Patent No.: US 6,690,645 B1
(45) Date of Patent: Feb. 10, 2004

(54) METHOD AND APPARATUS FOR ACTIVE QUEUE MANAGEMENT BASED ON DESIRED QUEUE OCCUPANCY

(75) Inventors: James Aweya, Nepean (CA); Delfin Y. Montuno, Kanata (CA); Michel Ouellette, Rockland (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/455,445

(22) Filed: Dec. 6, 1999

(51) Int. Cl.[7] ............................................. H04L 12/26
(52) U.S. Cl. ..................................... 370/230; 370/412
(58) Field of Search .............................. 370/230.1, 230, 370/412, 468

(56) References Cited

U.S. PATENT DOCUMENTS 6,333,917 B1 * 12/2001 Lyon et al. .................. 370/236
6,463,068 B1 * 10/2002 Lin et al. ..................... 370/414

OTHER PUBLICATIONS

Feng, Wu–chang; Kandlur, Dilip D.; Saha, Debanjan; Shin, Kang G.; "Techniques for Eliminating Packet Loss in Congested TCP/IP Networks", U. Michigan CSE–TR–349–97, Nov. 1997.

Feng, Wu–chang; Kandlur, Dilip D.; Saha, Debanjan; Shin, Kang G.; "BLUE: A New Class of Active Queue Management Algorithms", U. Michigan CSE–TR–387–99, Apr. 1999.

Ott, Teunis J.; Lakshman, T.V.; Wong, Larry H.; "SRED: Stabilized RED", INFOCOM '99, Eighteenth Annual Joint Conference of the IEEE Computer and Communications Societies Proceedings, IEEE, Jun. 1999, vol. 3, pp. 1346–1355.

Floyd, Sally: Jacobson, Van; "Random Early Detection Gateways for Congestion Avoidance", Networking, IEEE/ACM Transactions, Aug. 1993, vol. 14, pp. 397–413.

* cited by examiner

*Primary Examiner*—Melvin Marcelo (57) ABSTRACT

A method and apparatus for controlling a rate at which packets are transmitted to a network node having a queue and a network element employing same is described. The method and apparatus cooperate to generate a probability value in response to queue occupancy and desired queue occupancy and to control the packet in response to the probability value and a reference value to cause a source of the packet to change its transmission rate. Control of the packet is achieved by dropping the packet or by modifying the packet to include a message informing the source that it should adjust its transmission rate. In one embodiment, the probability value is converted into an inter-drop/mark value representing the number of packets to be admitted into the queue between dropped or marked packets.

34 Claims, 9 Drawing Sheets

METHOD AND APPARATUS FOR ACTIVE QUEUE MANAGEMENT BASED ON DESIRED QUEUE OCCUPANCY

BACKGROUND OF THE INVENTION

1. Field of the Invention

The present invention relates to congestion control in a network and more particularly to Active Queue Management based on desired queue occupancy.

2. Description of Related Art

With the proliferation of internet and data communications, communication networks are being used to carry an increasing amount of traffic. At the same time, user expectations for network speed and reliability are also increasing.

In a packet network such as the Internet for example, packets of information are conveyed between a packet source and a packet sink. The source may be any device that transmits data on the network and the sink may be any device that receives data from a network. Typically, a sink will send an acknowledgement signal to a source of a packet to indicate that a packet has been received.

Between a source and a sink, data packets pass through intermediate elements on the network, for example routers, switches and gateways, which receive and queue data packets for transmission on one or more communications channels. To avoid overloading any given channel, packet transmission on each channel must be managed and controlled.

One technique for managing traffic on a network is to control transmissions from the sources. Typically, a source will have a packet queue and the rate at which packets are transmitted from the packet queue is determined by a sliding window operating on the packet queue, which prevents the source from transmitting a new packet onto the network whenever more than a specified number of transmitted packets remain unacknowledged by the corresponding sink. Each time a transmitted packet is acknowledged by the sink, the window advances, permitting the source to transmit a new packet onto the network. The size of the window may be varied by the source, depending on the capacity of the channel and the ability of the sink to accept packets. These two factors are measured by receiving acknowledgements at the source. Generally if acknowledgements are received, the rate of transmission is increased by increasing the size of the window and if acknowledgements are not received or duplicate acknowledgements are received, i.e. packet loss is occurring, then the rate of transmission is decreased by decreasing the size of the window. Hence, there exists a relationship in which packet loss causes a packet source to reduce its transmission rate, which in turn reduces network congestion.

Effectively, the rate at which a source provides packets to the network is dependent upon receiving acknowledgements. An important consequence of this relationship is that an intermediate network element can intentionally discard or drop packets to prevent them from reaching the sink, thereby eliminating any acknowledgement back to the source, resulting in the source failing to receive an acknowledgement, in which case it reduces its window size and packet transmission rate. In this manner, an intermediate network element can change packet transmission rates of any source from which it receives packets.

This intentional discarding or dropping of packets is referred to as active queue management. Using this technique, the intermediate element responds to increasing traffic by selectively dropping packets from a queue of the intermediate element well before the queue overflows, causing the sources of the dropped packets to reduce their transmission rates to ease queue congestion.

One form of active queue management is Random Early Detection (RED). A RED queue manager maintains a weighted average of the queue length and detects when the average queue length increases beyond a threshold. In response, it causes randomly selected packets to be dropped from the queue. The act of dropping randomly selected packets from the queue is spaced out in time to cause only some sources to decrease transmission rate while other sources continue to send packets at their previous rates.

The probability that a packet arriving at the queue is dropped depends on, among other things, the average queue length, the time elapsed since the last packet was dropped, and a maximum drop probability parameter. However, the weighting that each of these factors has on the probability of being dropped depends on network conditions including the number of active source-sink pairs ("connections"), for example. Consequently the probability that a packet will be dropped changes as network conditions change, resulting in a less than optimal packet drop probability over a wide range of network conditions.

Thus, there is a need for a queue management technique that can make optimum use of a queue by randomly discarding packets with an optimal drop probability that reflects network conditions to better utilize the queue. Additionally, it would be desirable for the technique to make optimum use of the queue without the need to estimate a number of active network connections to the queue and without collecting or analyzing state information on individual connections.

SUMMARY OF THE INVENTION

The present invention addresses the above needs by providing an apparatus and method for controlling a rate at which packets are transmitted to a network element having a queue, involving generating a probability value in response to queue occupancy and desired queue occupancy and controlling the packet in response to the probability value and a reference value to cause a source of the packet to change its transmission rate. Advantageously, this arrangement can be applied over a wide range of load levels and, network conditions and stabilizes queue occupancy at a level independent of the number of active network connections.

Generating the probability value preferably includes generating a current error value in response to the queue occupancy and the desired queue occupancy. In particular, the current error value may be time-filtered to produce a filtered current error value. Such filtering might be accomplished through producing a weighted sum of present and past current error values. This arrangement is desirable because data transmissions generally include uneven bursts of data and as a result, the amount of data stored in a queue may fluctuate significantly. The filtered current error value may further be weighted as a function of a pre-defined control gain factor and queue capacity and the probability value may be calculated as a function of the filtered current error value and a previous probability value.

In one embodiment, the reference value may be a random number generated by a random number generator.

In one embodiment a controller controls admission of the packet into the queue in response to the probability value and the reference value. More particularly, the probability value is compared to the reference value, and if the probability value is greater than or equal to the reference value then the packet is discarded, otherwise the packet is admitted into the queue.

In a variation of the above embodiment, an inter-drop/mark value, representing a number of packets to be accepted into the queue between dropped or marked packets, is generated as a function of the drop probability value and admission of a packet to the queue or marking of a packet is controlled in response to the inter-drop/mark value. In particular, the inter-drop/mark value may be generated as the floor of the reciprocal of the probability value. Use of the inter-drop/mark value to admit or reject packets permits a specific probability, for example 25%, to be achieved by regularly dropping packets or marking packets, for example every fourth packet arriving at the queue. In such an embodiment, the reference value used by the controller may be generated by producing a representation of a count of packets arriving at the queue. The admission of a packet into the queue or marking of a packet may be controlled in response to the probability value in the form of an inter-drop/mark value and the reference value in the form of a count. More particularly, the inter-drop/mark value may be compared to the reference value, and if the inter-drop/mark value is less than or equal to the count then the packet is discarded, or marked, otherwise it is admitted into the queue.

Where the controller causes the packet to be marked, the packet is modified to include a congestion notification message for receipt by the sink, rather than dropping the packet. The congestion notification message is to inform the sink that congestion was experienced somewhere along the communication channel. For example, a header of the packet may be modified to include such a message. When the sink receives a packet with the congestion notification message (that is, a "marked packet"), the sink sends an acknowledgement to the source with the acknowledgement modified to include a congestion notification message. In this manner, the net effect at the source is that an acknowledgement including a congestion notification message is received, and in response, the source reduces its transmission rate. This embodiment provides the benefit that the packet is not dropped, but rather is received by the sink.

Effectively, by causing arriving packets to be dropped or marked in response to a probability calculated in response to queue occupancy and desired queue occupancy, the probability continually changes depending on the status of the queue. Consequently, the probability that a sink will not send an acknowledgement or alternatively, that a sink will send an acknowledgement carrying a congestion notification message to the source also changes, resulting in a corresponding change in transmission rate of the source. Thus the flow of packets is better controlled in the sense that the queue is less likely to overflow or be under-utilized. Effectively, packets are dropped or marked as necessary to urge the queue occupancy level toward a desired queue occupancy level under a wide range of network conditions. A queue having a queue occupancy level stabilized about a desired queue occupancy level provides higher resource utilization, predictable delays, more certain buffer provisioning, and load-independent performance. These benefits may be achieved without the need to estimate a number of active network connections to the queue and without collecting or analyzing state information on individual connections.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings that illustrate embodiments of the invention.

DETAILED DESCRIPTION

Figure 1:
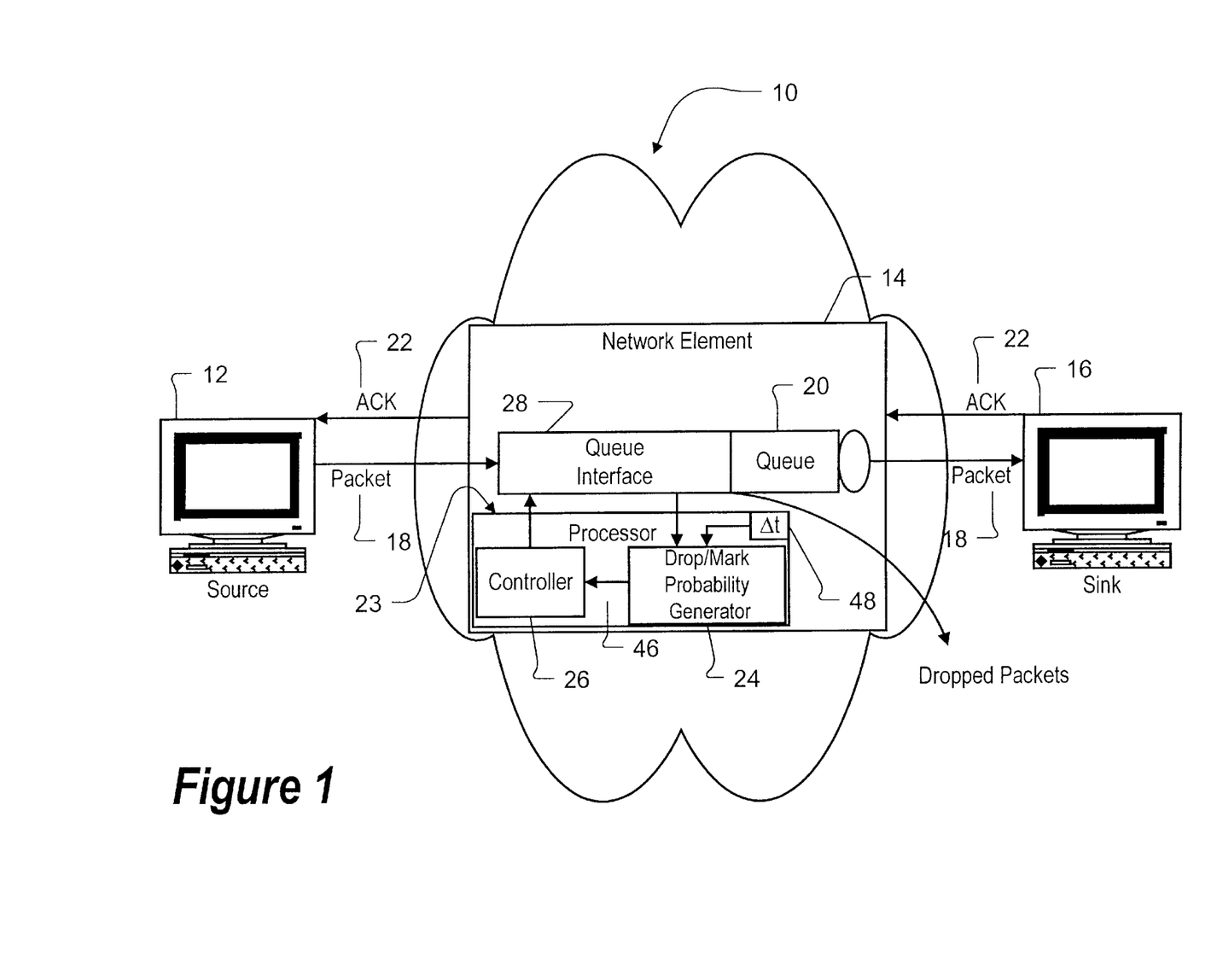
FIG. 1 is a block diagram of a network, including a data source, a data sink, and an intermediate network element having a data queue, according to a first embodiment of the invention.

As shown generally at 10 in FIG. 1, a network according to a first embodiment of the invention includes a data source 12, a network element 14 and a data sink 16. In general, the source 12 transmits data to the network element 14, which in turn transmits the data to the sink 16. In this embodiment, the data transmitted by the source 12 packets 18. In this specification, the term "packet" is applied broadly, and contemplates any quantum of data, such as a block, a frame, a datagram, a cell, a word, a byte, or a bit, for example.

The source 12 may be any device capable of transmitting data on a network, for example a telephone, a computer, a terminal, a video camera, an appliance with embedded logic or processor circuitry, or more generally any telecommunication or telephony device. Additionally, the source 12 may also receive data from the network 10, and in this capacity might also function as a sink.

The sink 16 may be any device capable of receiving data on a network, for example a telephone, a computer, a terminal, a video receiver, an appliance with embedded logic or processor circuitry, or more generally any telecommunication or telephony device. Additionally, the sink 16 may also transmit data on the network 10, and in this capacity might also function as a source.

When the sink 16 receives a packet 18, it transmits an acknowledgement 22 to the network element 14, and the network element 14 propagates the acknowledgement 22 to the source 12. The source 12 is configured to increase the rate at which it transmits packets 18 when it receives one or more acknowledgements 22 and to reduce the rate at which it transmits packets 18 when it has not received one or more expected acknowledgements 22 for longer than a specified timeout interval.

The network element 14 may be any device connected to the network 10 between the source 12 and the sink 16 to receive packets 18 from the source and to forward the packets to the sink. Generally, there may be a number of such network elements 14 connected to the network between the source and the sink. In this embodiment, the network element 14 is a store-and-forward device, for example a router, a switch, or a gateway.

The network element 14 includes a queue 20 into which the data packets 18 transmitted by the source 12 are normally received for storage and forwarding to the sink 16. The queue 20 has a total queue capacity Q, a queue occupancy q, a target or desired queue occupancy T and a lower occupancy threshold or minimum value L.

The total queue capacity Q represents the total storage space available in the queue 20 for storing packets 18.

The queue occupancy q represents the number of packets 18 that are currently stored in the queue 20, and may be expressed as a number of packets 18, an amount of memory, or a ratio of the total queue capacity Q.

The desired queue occupancy T represents a queue occupancy that a network designer expects will yield a good network performance balance between speed and reliability, or in other words, between the opposing risks of queue under-utilization and queue overflow. It has been found that $$T \cong \frac{Q}{2}$$

is generally suitable, provided there is adequate buffering.

The minimum value L is a minimum queue occupancy threshold selected by a network designer, below which all packets 18 arriving at the queue 20 should be accepted into the queue 20 to resist queue under-utilization. It has been found that $0.8T \leq L \leq 0.9T$ is generally suitable, although other values are also effective depending on circumstances.

In accordance with one embodiment of the present invention, the network element 14 is configured with an apparatus, generally illustrated at 23, for controlling a rate at which packets are transmitted to the network element 14. The apparatus 23 has a drop/mark probability generator 24 for generating a drop/mark probability value in response to the queue occupancy q and the desired occupancy value T. The apparatus 23 further has a controller 26 for controlling the dropping or marking of a packet 18 arriving at the queue 20 in response to the drop/mark probability value and a reference value.

The drop/mark probability generator 24 and the controller 26 control the dropping or marking of a packet 18 arriving at the queue 20 through a queue interface 28. Generally, the drop/mark probability generator 24 receives information from the queue interface 28 and the controller 26 provides signals to the queue interface 28 to indicate whether or not an arriving packet 18 should be dropped or marked. More particularly, the queue interface 28 provides the queue occupancy level q to the drop/mark probability generator 24 and the controller 26 provides a simple digital signal to the queue interface 28 to indicate whether the packet should be dropped or marked.

Thus, the drop/mark probability generator 24 and the controller 26 cooperate to direct the queue interface 28 to either admit or discard or mark packets 18 arriving at the queue 20 to cause the queue occupancy level q to converge toward the desired queue occupancy level T. Because discarded packets are not received at the sink 16, the sink 16 does not acknowledge receipt of the discarded packets to the source 12, and in response the source 12 reduces its packet transmission rate, thereby decreasing congestion at the queue 20. Alternatively, marked packets received at the sink 16 will cause an acknowledgement carrying a congestion notification message to be sent to the source 12, and in response the source 12 reduces its transmission rate.

Advantageously, this arrangement can be applied to stabilize queue occupancy q at a desired queue occupancy level T independent of the number of active network connections, over a wide range of load levels and network conditions. A queue thus stabilized yields a number of benefits in a network, including higher resource utilization, predictable delays, more certain buffer provisioning, and load-independent performance. Desirably, these benefits are achieved without estimating the number of active network connections or flows and also without collecting or analyzing state information on individual flows.

The functionality of the apparatus 23 for controlling a packet may be implemented by a processor circuit 46 at the network element 14, for example. In such an embodiment, the processor circuit 46 may be programmed to implement the functionality of the drop/mark probability generator 24 and the controller 26 by codes provided by a computer readable medium, such as CD-ROM, a diskette, or EPROM, for example. Alternatively, or in addition, such codes may be provided by code segments of a signal embodied in a carrier wave and may be received by downloading from a server on the Internet or other communications network, for example.

Figure 2:
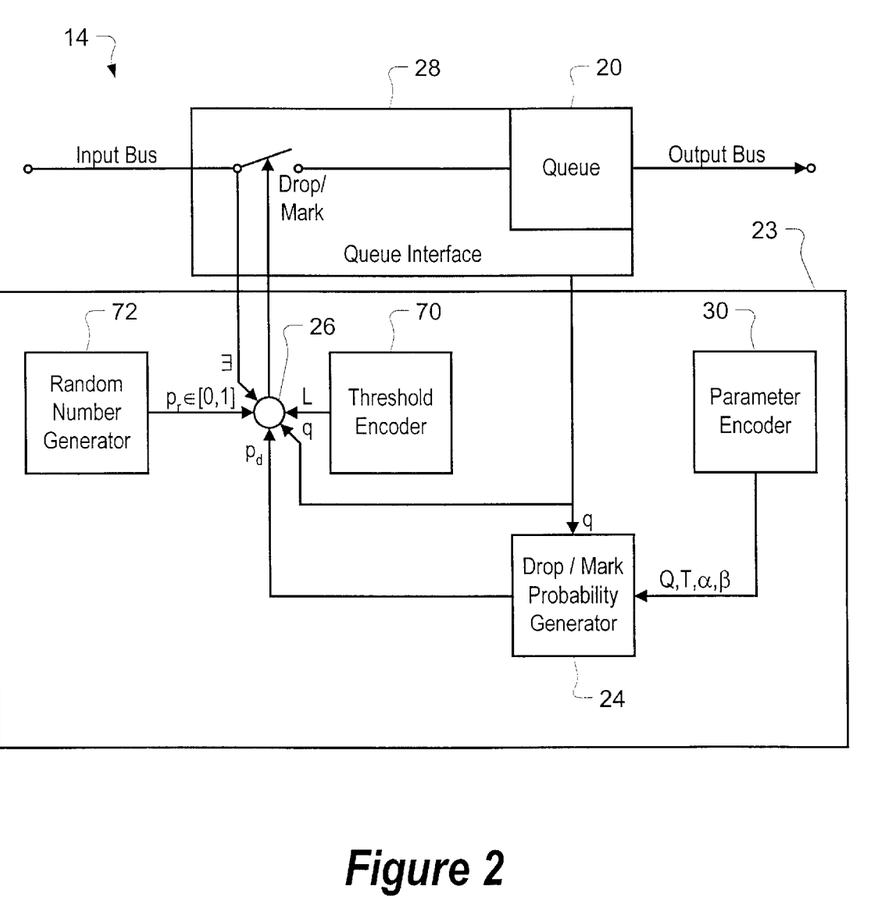
FIG. 2 is a block diagram of the network element of FIG. 1, illustrating a drop/mark probability generator and a controller in communication with the data queue.

Referring to FIG. 2, the network element is shown at 14. Generally, the drop/mark probability generator 24 receives a current queue occupancy value q from the queue interface 28 and also receives a set of parameters from a parameter encoder 30. In response the drop/mark probability generator 24 generates a drop/mark probability value $P_d$ for use by the controller 26.

The parameters received from the parameter encoder 30 include the total queue capacity Q, the desired occupancy value T, a control gain $\alpha$, and a filter gain $\beta$, each of which may be preprogrammed or set by a user. The parameter encoder 30 may be implemented by any device that enables a user to set a parameter, such as a potentiometer or a computer input device for example. Because the parameter encoder 30 encodes the desired occupancy value T, it functions as a desired occupancy value generator for generating the desired occupancy value.

The selection of the control gain $\alpha$ and the filter gain $\beta$ generally results from empirical investigation and analysis based on simulations. It has been found that one set of values that is generally suitable when data flows in the network 10 are measured in packets is $\alpha=0.00005$ and $\beta=0.002$. However, this set of values is provided merely as an example and it is expected that other values may also be effective in various circumstances.

Figure 3:
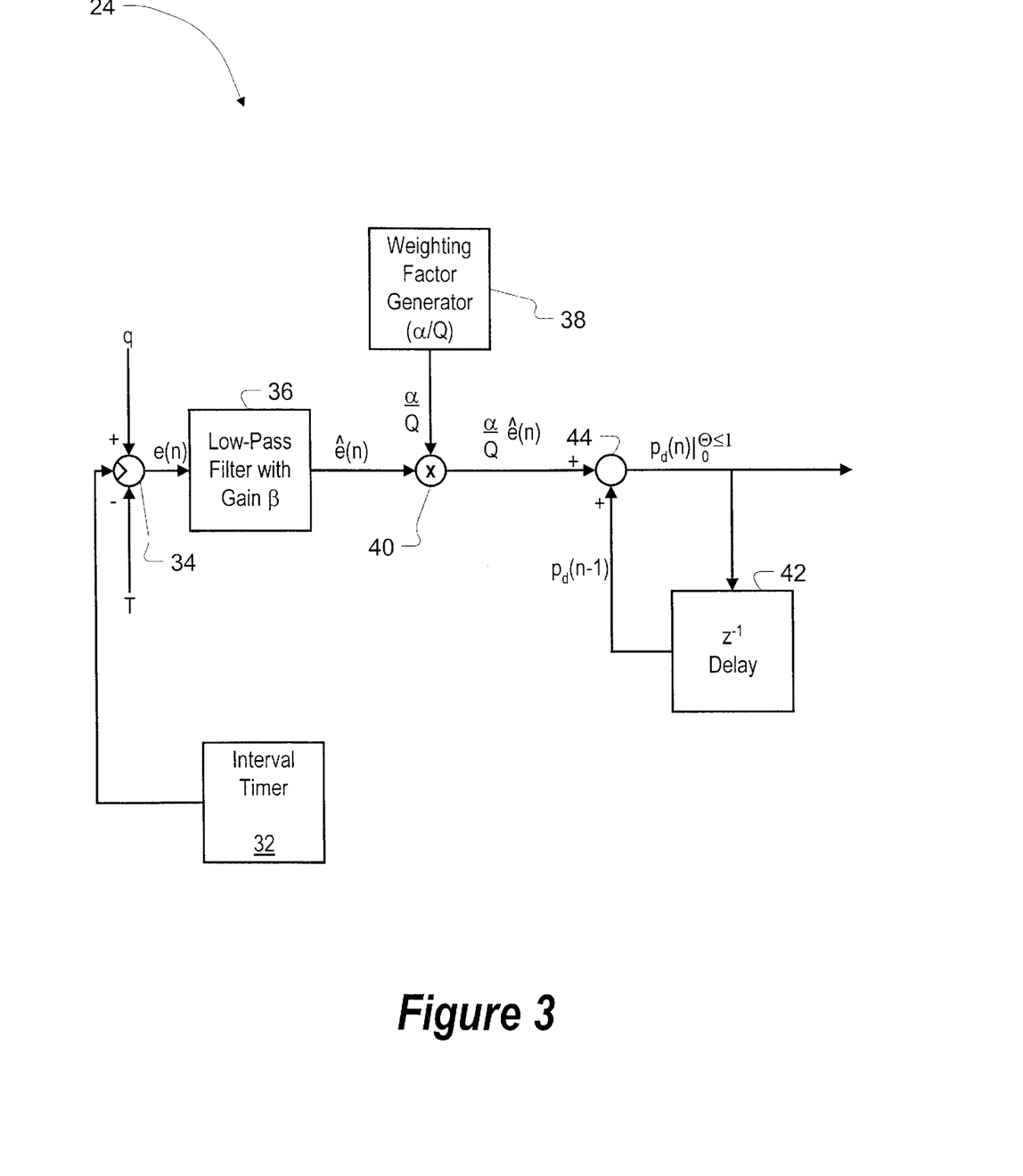
FIG. 3 is a block diagram of the drop/mark probability generator of FIG. 2.

The drop/mark probability, generator 24 is illustrated in still greater detail in FIG. 3 and includes an interval timer 32 that decrements from a predetermined sampling/control-interval value $\Delta t$. The expiration of the interval timer 32 marks the beginning of a new time-interval n, whereupon the interval timer 32 is reset to begin decrementing the sampling/control-interval value $\Delta t$.

The drop/mark probability generator 24 further includes an error value generator 34 for generating a current error value e in response to the queue occupancy value q and the desired occupancy value T. More particularly, at the beginning of each new time-interval n, the error value generator 34 generates a current error value e(n) in response to the current queue occupancy value q(n) and the desired occupancy value T.

The drop/mark probability generator 24 further includes a filter 36 having a filter gain $\beta$ for time-filtering the current error value e(n) to produce a filtered current error value ê(n). Time-filtering is desirable because data traffic tends to include uneven bursts and therefore the unfiltered current error value e(n) may fluctuate significantly, which could hamper convergence of the queue occupancy value q(n) toward the desired occupancy value T.

In this embodiment, the filter 36 stores filtered error values ê from previous time intervals. For example, the immediately previous filtered error value ê(n−1) may be stored. The filter 36 generates the filtered current error value ê(n) as a weighted sum of present and past current error values, for example according to the equation ê(n)=(1−β)ê(n−1)+βe(n).

The drop/mark probability generator 24 weights the filtered current error value ê(n) as a function of the pre-defined control gain factor α and the total queue capacity Q. This weighting allows a user to tune the system to encourage convergence of the queue occupancy value q(n) toward the desired occupancy value T. In this embodiment, the drop/mark probability generator 24 includes a weighting factor generator 38 for generating as a weighting factor the quotient $$\frac{\alpha}{Q}$$

and a multiplier 40 for multiplying the filtered current error value ê(n) by the weighting factor $$\frac{\alpha}{Q}.$$

The drop/mark probability generator 24 may be configured to generate the current drop/mark probability value $P_d(n)$ as a function of the filtered current error value ê(n) and previous drop/mark probability values, for example the immediately previous drop/mark probability value $p_d(n-1)$. In this embodiment, the drop/mark probability generator 24 calculates the current drop/mark probability value $p_d(n)$ as the sum of the immediately previous drop/mark probability value $p_d(n-1)$ and the weighted filtered current error signal $$\frac{\alpha}{Q}\hat{e}(n),$$

i.e. as $$p_d(n) = p_d(n-1) + \frac{\alpha}{Q}\hat{e}(n).$$

In this regard the drop/mark probability generator 24 requires a memory device 42 for maintaining a memory of the immediately previous drop/mark probability value $p_d(n-1)$ and an adding device 44 for adding the immediately previous drop/mark probability value $p_d(n-1)$ and the weighted filtered current error signal $$\frac{\alpha}{Q}\hat{e}(n).$$

The above components of the drop/mark probability generator 24 may be implemented in a variety of ways, including combinations of one or more discretely implemented components operating in an analog, digital, or mixed mode. In this embodiment the drop/mark probability generator 24 is implemented by the processor circuit 46 shown in FIG. 1 including a timer 48 that acts as the interval timer 32 shown in FIG. 3.

Figure 4:
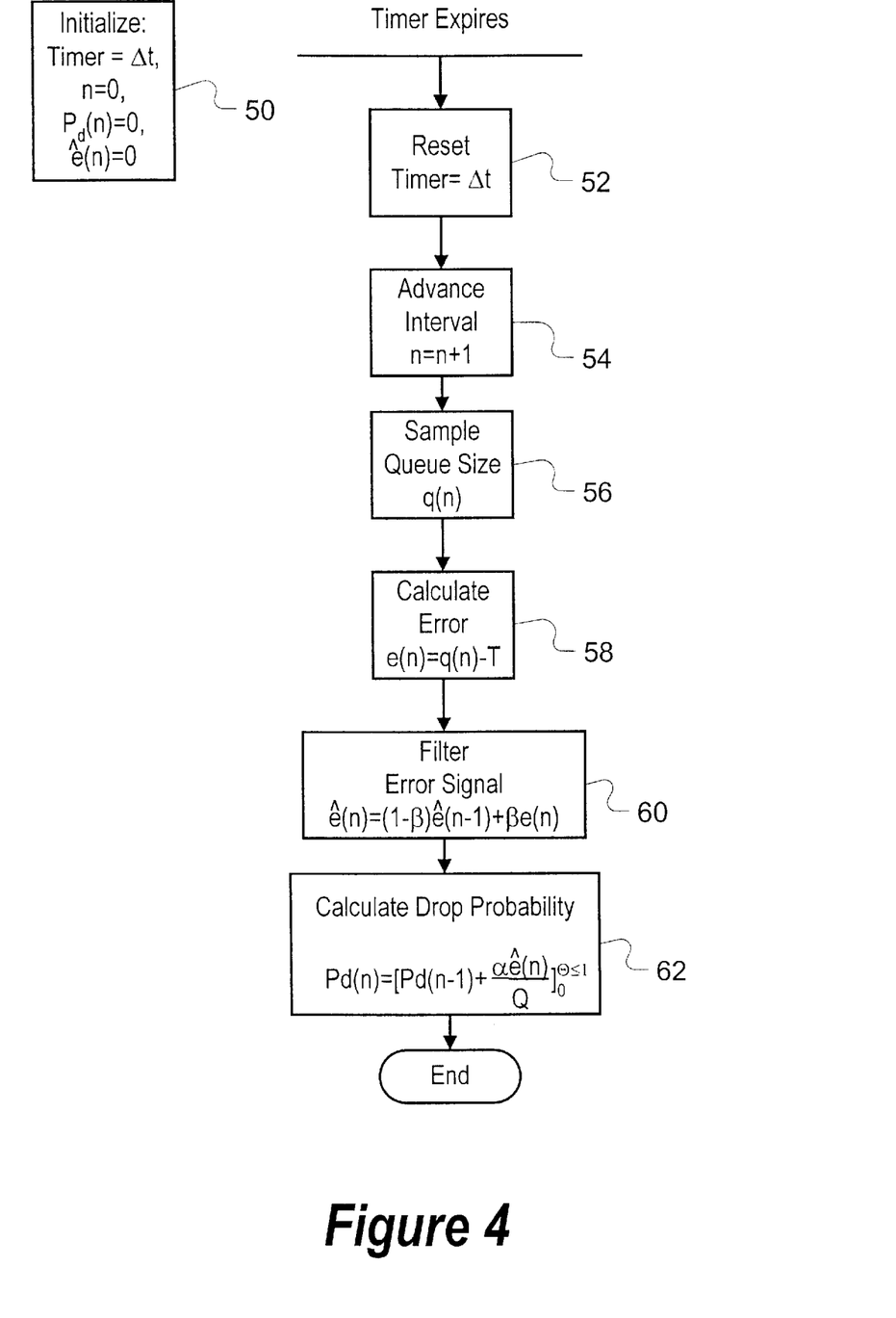
FIG. 4 is a flowchart illustrating the operation of the drop/mark probability generator of FIG. 2.

Referring to FIG. 4 there is shown a flowchart of an algorithm implemented by blocks of program codes executed by the processor circuit 46 for calculating the current drop/mark probability value $p_d(n)$. The algorithm begins at block 50, which directs the processor circuit 46 to initialize the timer 48 to the sampling/control-interval value Δt, to initialize a sample index n to 0, to initialize the current packet drop/mark probability $p_d(n)$ to 0, and to initialize the current filtered error signal ê(n) to 0.

The timer 48 decrements from the sampling/control-interval value Δt, and when it expires, block 52 is invoked, for example through an interrupt signal produced by the timer 48. Block 52 directs the processor circuit 46 to reset the interval timer with the sampling/control-interval value Δt. Thus, the timer 48 marks sampling/control intervals of duration Δt.

Thereafter, block 54 directs the processor circuit 46 to increment the sample index n, i.e. n=n+1, causing an advance to the next sampling/control interval.

Block 56 directs the processor circuit 46 to sample a new current queue occupancy value q(n) from the queue interface 28 and block 58 directs the processor circuit 46 to generate a new current error value e(n) as the difference between the new current queue occupancy value q(n) and the desired occupancy value T, i.e. e(n)=[q(n)−T].

Block 60 then directs the processor circuit 46 to generate a filtered current error value ê(n), as a weighted sum of past and present error values, in this embodiment according to the equation ê(n)=(1−β)ê(n−1)+βe(n).

Finally, block 62 directs the processor circuit 46 to generate a current drop/mark probability value $p_d(n)$ as a function of a previous drop/mark probability value $p_d(n-1)$ and the filtered current error value ê(n). In this embodiment, the filtered current error value ê(n) is weighted as a function of the pre-defined control gain factor α and queue capacity Q. Thus, the current drop/mark probability value $p_d(n)$ is generated according to the equation $$p_d(n) = p_d(n-1) + \frac{\alpha\hat{e}(n)}{Q}.$$

This drop/mark probability value $p_d(n)$ is communicated to the controller 26.

Generally, the controller 26 receives the current queue occupancy value q(n) from the queue interface 28, and the current drop probability value $p_d(n)$ from the drop/mark probability generator 24.

Referring back to FIG. 2, in addition the controller 26 is in communication with a threshold controller 70 and a reference value generator 72 which in this embodiment is a random number generator.

The threshold encoder 70 generates a minimum value L corresponding to the minimum queue occupancy threshold selected by the network designer, below which all packets 18 arriving at the queue 20 should be accepted into the queue 20 to resist queue under-utilization. The minimum value L may be preprogrammed or set by a user. The threshold encoder 70 may be any device that enables a user to set a parameter and may be integrated with the parameter encoder 30 or may be a separate device. In this regard, the threshold encoder 70 might include potentiometers or computer input devices for example. The threshold encoder 70 communicates the minimum value L to the controller 26.

The random number generator 72 generates as a reference value $p_r \in [0,1]$ a random or pseudo-random number between 0 and 1. The random number generator 72 may be implemented through programming the processor circuit 46 according to algorithms well known in the art and not the subject of the present invention. The random number generator communicates the reference value to the controller 26.

It will be appreciated that the controller 26 also receives from the queue interface 28 a packet arrival signal ∃, indicating that a packet 18 has arrived at the packet interface 28 and must be either admitted or discarded or marked.

Generally, the controller 26 functions to determine whether an arriving packet 18 should be dropped or marked in response to the drop/mark probability value $p_d(n)$ and the reference value $p_r$. More particularly, in response to receiving the current queue occupancy value $q(n)$, the current drop/mark probability value $p_d(n)$, the minimum value L, the reference value $p_r \in [0,1]$, and the packet arrival signal ∃, as described above, the controller 26 generates a Boolean admission signal "D/M" for directing the queue interface 28 to drop or mark a packet according to the following logic:

if $q(n)<L$, then D/M=inactive, else, if $p_r \in [0,1] \leq p_d$, then D/M=active, else, D/M=inactive.

Figure 5:
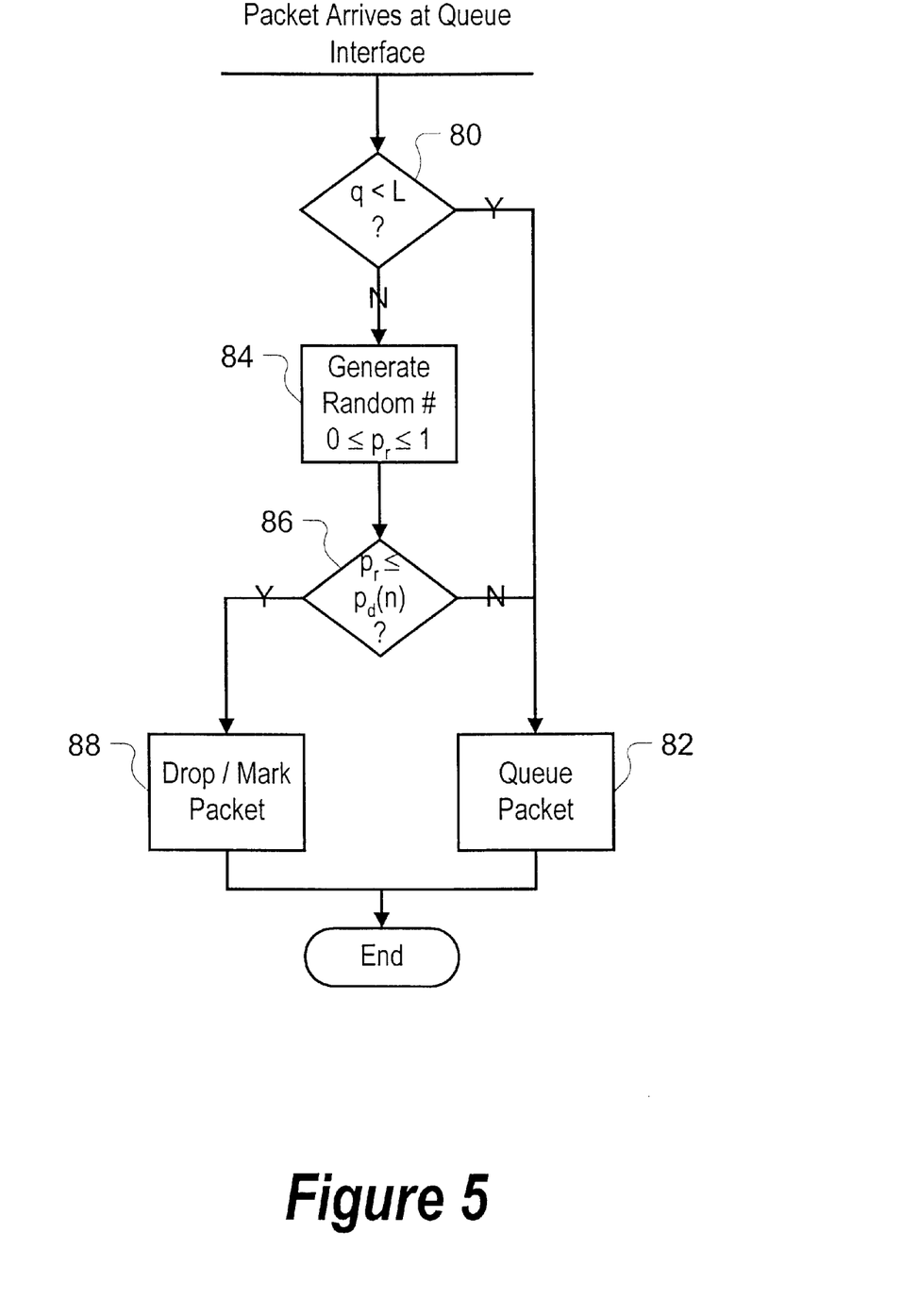
FIG. 5 is a flowchart illustrating the operation of the controller of FIG. 2.

The controller 26 may be implemented in a variety of ways, including combinations of one or more discretely implemented components operating in an analog, digital, or mixed mode, for example. In particular, the controller 26 might be implemented by a logic circuit or by the processor circuit 46 shown in FIG. 1.

Where the processor circuit 46 shown in FIG. 1 is used to implement the controller 26, the processor circuit 46 is programmed by blocks of codes to execute a controller algorithm as shown in FIG. 5. The algorithm is invoked whenever a packet arrival signal ∃ is received from the queue interface 28. An active packet arrival signal ∃ may act as an interrupt to the processor circuit 46 for example.

The controller algorithm begins with block 80, which directs the processor circuit 46 to compare the current queue occupancy $q(n)$ to the minimum value L. If the current queue occupancy $q(n)$ is less than the minimum value L, then the current queue occupancy $q(n)$ is lower than its designated minimum threshold and the newly-arrived packet 18 should be queued. Therefore at block 82, the processor circuit 46 is directed to set the D/M signal inactive to cause the queue interface 28 to admit the packet 18 into the queue without modification to the packet header.

Alternatively, if the current queue occupancy $q(n)$ is greater than the minimum value L, then it may be desirable to cause the newly-arrived packet 18 to be dropped or marked. Thus at block 84 the processor circuit 46 is directed to generate a random reference value $p_r$ and at block 86 the processor circuit 46 is directed to compare the current drop/mark probability value $p_d(n)$ to the reference value $p_r$.

If the current drop/mark probability value $p_d(n)$ is greater than or equal to the reference value $p_r$, then at block 88 the processor circuit 46 is directed to set the D/M signal to active to cause the queue interface 28 to discard the packet 18 or to cause the queue interface to modify the header of the packet (that is, mark the packet) so that when it reaches the sink, the sink is informed to produce an acknowledgement carrying a congestion notification message to the source.

Alternatively, if the current drop/mark probability value $p_d(n)$ is less than the reference value $p_r$, then at block 82 the processor circuit 46 is directed to set the D/M signal to inactive to cause the queue interface 28 to admit the packet 18 into the queue, without modification to the header.

Thus the D/M signal produced by the controller 26 causes the queue interface 28 to either admit or not admit packets 18 into the queue 20 or to admit but mark the packet telling the sink to send an acknowledgement carrying a congestion notification message to the source. When a packet 18 is not admitted into the queue 20 it is simply discarded and consequently the packet is not permitted to enter the queue. Such a discarded packet is never queued for transmission to the sink 16 and therefore the sink never sends an acknowledgement signal for the packet back to the source 12. The absence of receiving the acknowledgement signal causes the source to reduce its packet transmission rate, and consequently, the rate at which packets are received from the source 12 at the queue 20 is reduced, thereby easing congestion at the queue. Thus it will be appreciated that the rate at which packets 18 are received from a source 12 is throttled back by the D/M signal produced by the apparatus 23, in response to the queue occupancy q and desired queue occupancy T. One can discourage packet dropping or marking at the queue 20 by increasing the desired occupancy value T. Conversely, queue congestion may be reduced by decreasing the desired occupancy value T.

Figure 6:
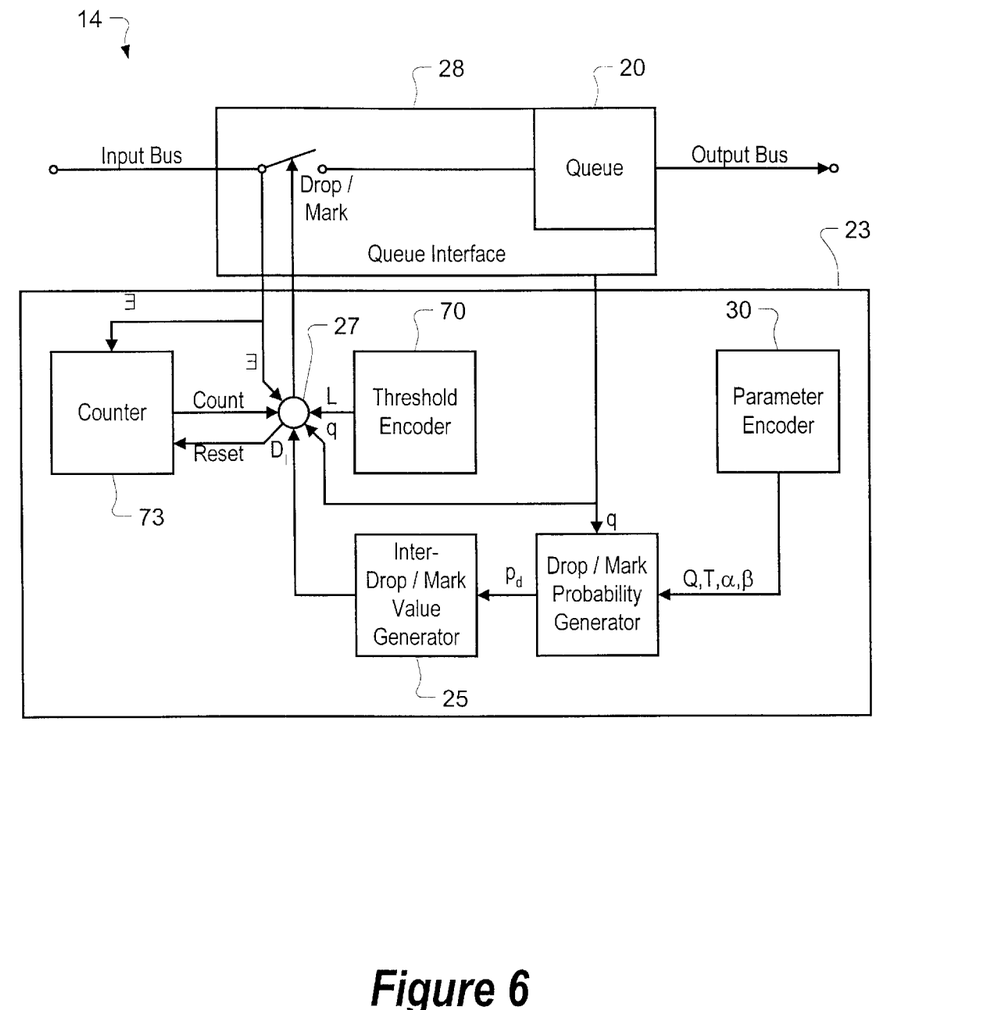
FIG. 6 is a block diagram of the network element of FIG. 1 according to a second embodiment of the invention, illustrating an inter-drop/mark value generator and a controller in communication with the data queue.

As shown in FIG. 6, according to a second embodiment of the invention, the apparatus 23 further includes an inter-drop/mark value generator 25. Also, in this embodiment the random number generator 72 of FIG. 2 has been replaced with a packet counter 73.

The apparatus 23 includes a modified controller 27, which is similar to and substitutable for the controller 26 described in connection with the first embodiment except that it is configured to communicate with the inter-drop/mark value generator 25 instead of the drop/mark probability generator 24 and with the packet counter 73 instead of the random number generator 72 of FIG. 2.

With the apparatus 23 according to the second embodiment, a specific drop/mark probability $p_d$ can be achieved by dropping or marking every $n_{th}$ packet 18 that arrives at the network element 14, where n is calculated from the packet drop/mark probability value $p_d$. For example, a packet drop/mark probability $p_d$ of 25% can be achieved by causing every fourth packet 18 that arrives at the queue 20 to be dropped.

Thus, whereas the apparatus 23 of the first embodiment of the invention employs a drop/mark probability generator 24 and a random number generator 72 to calculate when a packet 18 should be dropped or marked, the apparatus 23 of the second embodiment employs an inter-drop/mark value generator 25 and a packet counter 73.

In general, the inter-drop/mark value generator 25 generates an inter-drop value $D_I$ representing a number of packets 18 to be admitted to the queue 20 between any two packets not admitted to the queue 20 or marked. Thus, the inter-drop value $D_I$ causes the ratio of the number of packets dropped or marked to the number of packets 18 that arrived at the queue 20 to equal the drop/mark probability value $p_d$ over the long term.

Figure 7:
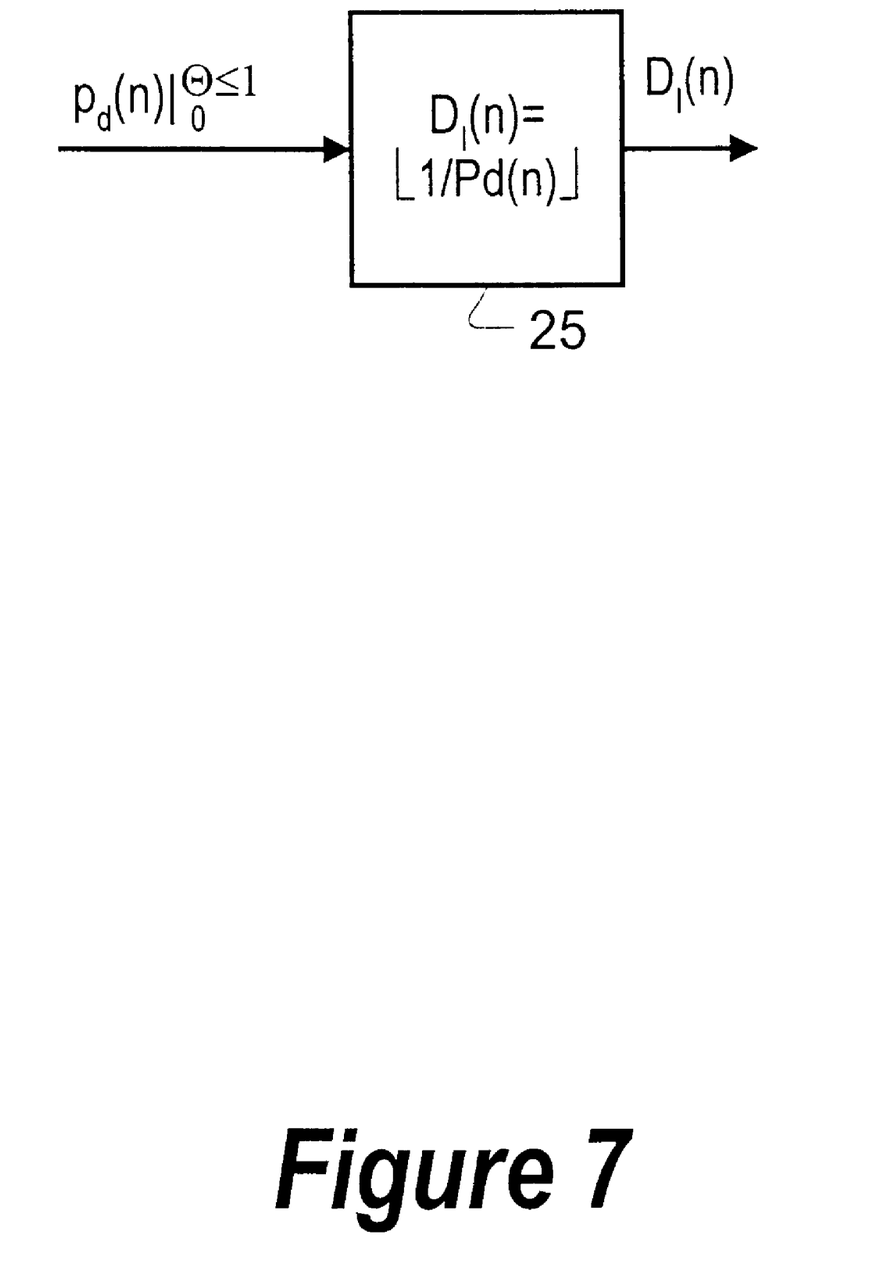
FIG. 7 is a block diagram of the inter-drop/mark value generator of FIG. 6.

In particular, with reference now to FIG. 7, the inter-drop/mark value generator 25 receives the current drop/mark probability value $p_d(n)$ from the drop/mark probability generator 24, and in response generates a current inter-drop value $D_I(n)$. In this embodiment, the inter-drop/mark value generator 25 generates the current inter-drop value $D_I(n)$ as the floor of the reciprocal of the current drop/mark probability value $p_d(n)$, i.e.

$$D_I(n) = \left\lfloor \frac{1}{p_d(n)} \right\rfloor.$$

Thus the inter-drop/mark value generator 25 generates as a function of the drop/mark probability value $p_d(n)$, an inter-drop/mark value $D_I(n)$ representing a number of packets 18 to be accepted into the queue 20 between packets to be dropped or marked, such that the controller 27 is operable to control dropping or marking of packets in response to the inter-drop/mark value $D_f(n)$.

The inter-drop/mark value generator 25 may be implemented in a variety of ways, including combinations of one or more discretely implemented components operating in an analog, digital, or mixed mode. In this embodiment, the inter-drop/mark value generator is implemented by the processor circuit 46 shown in FIG. 1, which is programmed to perform the calculation of the inter-drop/mark value $D_f(n)$ after first generating the drop/mark probability value $p_d(n)$ in the manner described in connection with FIG. 4.

Referring back to FIG. 6, the packet counter 73 counts the number of packets that have arrived at the queue interface 28 since the counter 73 was last reset. Generally, the counter 73 functions to produce a representation of a count of packets arriving at the queue interface for use as a reference value by the controller 27. In this regard, the packet counter 73 is in communication with the queue interface 28 to receive the packet arrival signal ∃ and increments a count value each time it receives the packet arrival signal ∃. A reset signal received from the controller 27 resets the count value to zero.

In this embodiment, the controller 27 receives the current queue occupancy value q(n) from the queue interface 28, the current inter-drop/mark value $D_f(n)$ from the inter-drop/mark value generator 25, the minimum value L from the threshold encoder 70, and the reference value Count from the counter 73. In response, the controller generates the Boolean admission signal "D/M" for directing the queue interface 28 to drop or mark a newly-arrived packet 18, according to the following logic:

if q(n)<L, then D/M=inactive, else, if Count≧$D_f(n)$, then D/M=active, and reset Count=0 else, D/M=inactive.

The controller 27 according to the second embodiment may be implemented in a variety of ways, including combinations of one or more discretely implemented components operating in an analog, digital, or mixed mode. In this embodiment, the controller 27 is implemented by the processor circuit 46 shown in FIG. 1.

Figure 8:
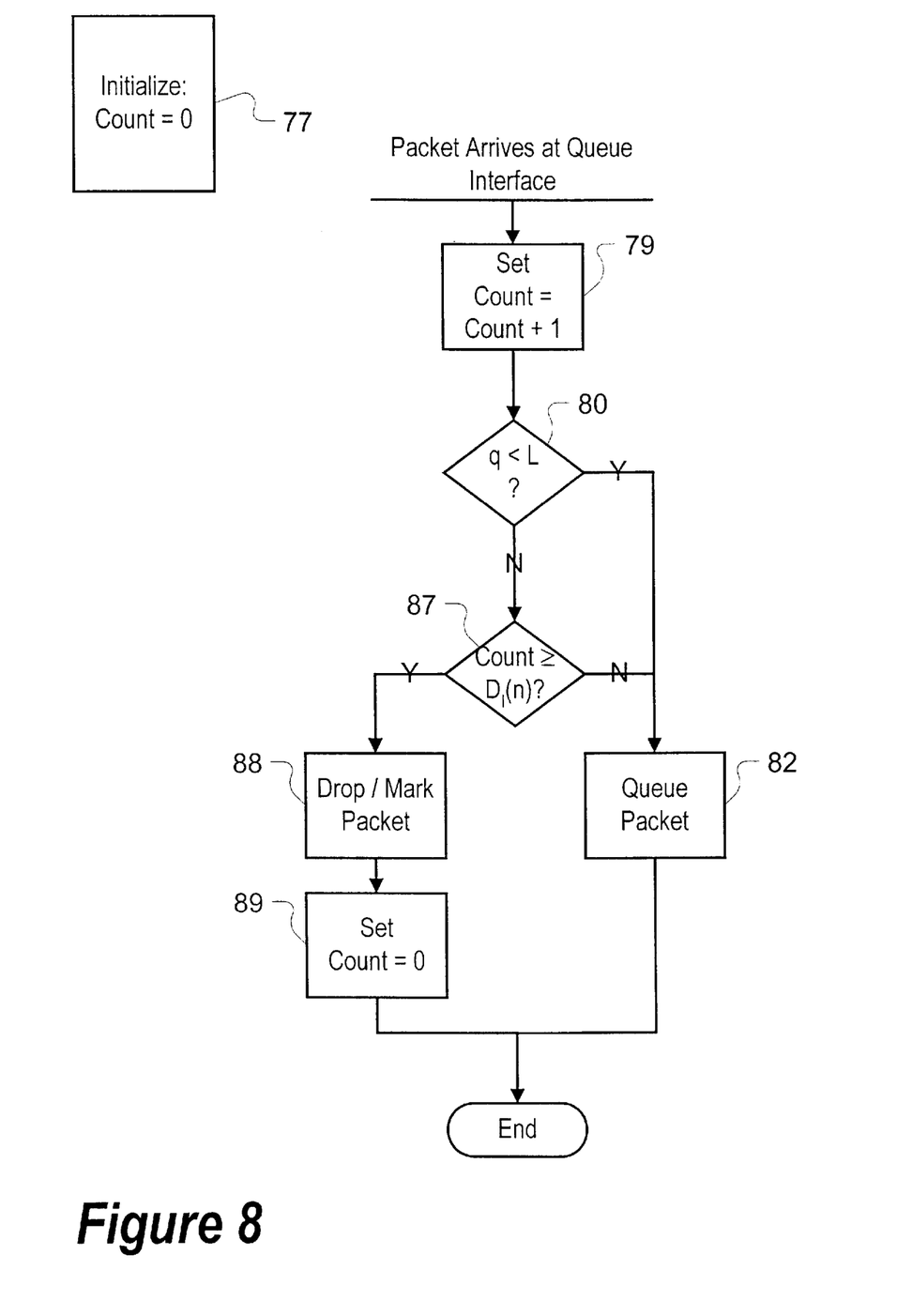
FIG. 8 is a flowchart illustrating the operation of the controller of FIG. 6.

FIG. 8 shows a flowchart of an algorithm implemented by blocks of code executed by the processor circuit 46 for implementing the controller 27. The algorithm is invoked whenever the packet arrival signal ∃ is received from the queue interface 28.

At block 77, the processor circuit 46 is directed to initialize the reference value Count to zero. This initialization occurs only when the controller 26 is first activated.

At block 79, in response to the queue interface 28 issuing a packet arrival signal ∃, the processor circuit 46 is directed to increment the reference value Count.

At block 80, the processor circuit 46 is directed to compare the current queue occupancy value q(n) to the minimum value L. If the current queue occupancy q(n) is less than the minimum value L, then the current queue occupancy q(n) is lower than its designated minimum threshold and the newly-arrived packet 18 should be queued. Therefore at block 82, the processor circuit 46 is directed to set the D/M signal inactive to cause the queue interface 28 to admit the packet 18 into the queue, without modification to the packet header.

Alternatively, if the current queue occupancy value q(n) is greater than the minimum value L, then it may be desirable to cause the newly-arrived packet 18 to be dropped or marked. Thus at block 87 the processor circuit 46 is directed to compare the current inter-drop/mark value $D_f(n)$ to the reference value Count.

If the current inter-drop/mark value $D_f(n)$ is less than or equal to the reference value Count, then at block 88 the processor circuit 46 is directed to set the D/M signal to active to cause the queue interface 28 to discard the packet 18 or to mark the packet by modifying the header of the packet so that when it reaches the sink, the sink is informed to produce an acknowledgement carrying a congestion notification message to the source. Thereafter, at block 89 the processor circuit 46 is directed to reset the reference value Count to zero.

Alternatively, if the current inter-drop/mark value $D_f(n)$ is greater than the reference value Count, then at block 82 the processor circuit 46 is directed to set the D/M signal to inactive to cause the queue interface 28 admit the packet 18 into the queue 20 without modification to the packet header.

Thus, in this embodiment, the apparatus 23 generates the D/M signal in response to a reference value, i.e. the current count value on the counter 73, and in response to an inter-drop/mark value $D_f(n)$, i.e. the floor of the reciprocal of the current drop/mark probability value $p_d(n)$ generated by the drop/mark probability generator 24. The D/M signal causes the queue interface 28 to either admit or drop or mark packets 18 arriving at the queue 20. When a packet 18 is not admitted into the queue 20 it is simply discarded and is never queued for transmission to the sink 16. Therefore, the sink 16 never sends an acknowledgement signal for the packet back to the source 12, with the same consequence as described in connection with the first embodiment, i.e. that the rate at which packets 18 are received from a source 12 is throttled back by the D/M signal produced by the apparatus 23 in response to the queue occupancy q and desired queue occupancy T.

Figure 9:
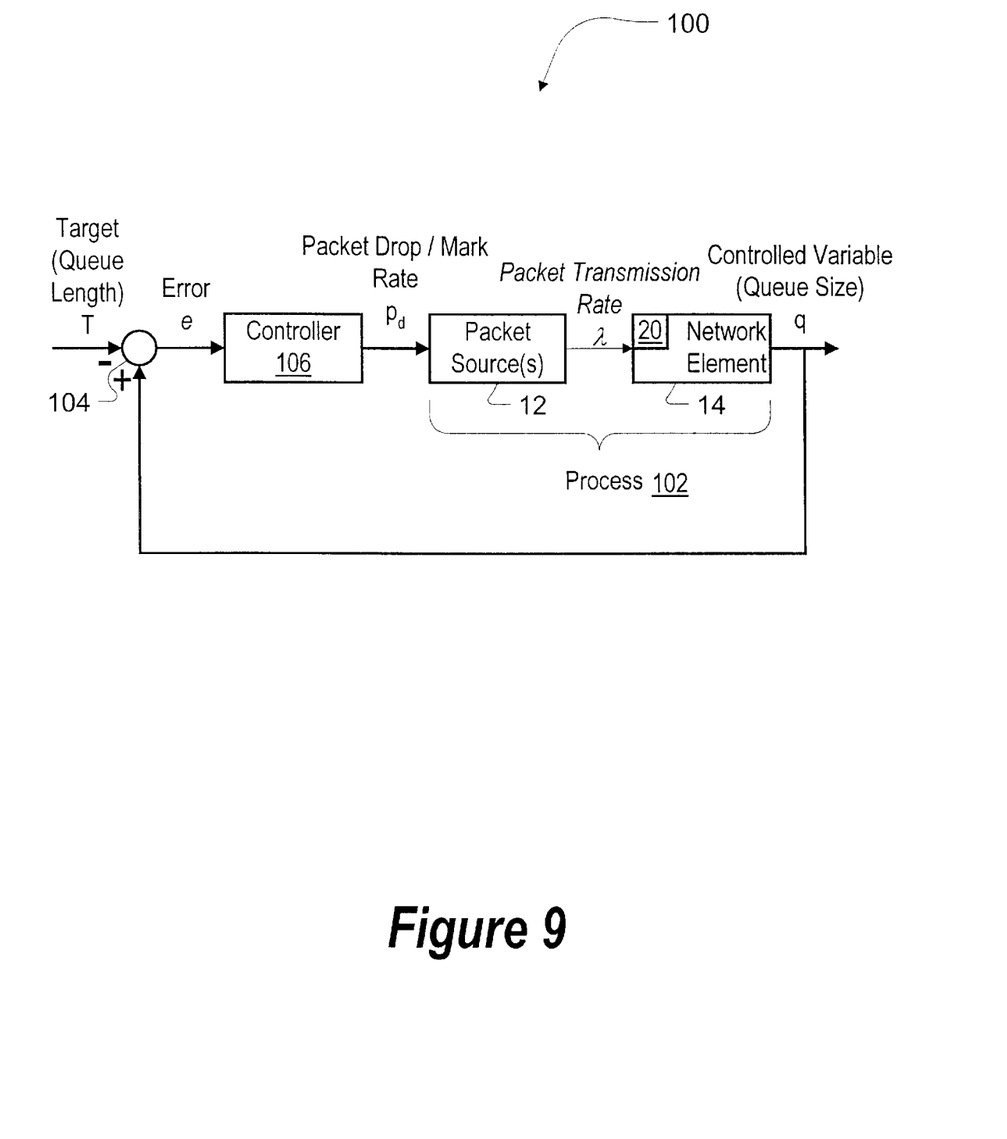
FIG. 9 is a block diagram of a control model of the network of FIG. 1.

In general, the mechanism by which the rate at which packets are transmitted from the source is controlled may be represented by a control system model illustrated at 100 in FIG. 9. In this model 100, the network element 14 and the source 12 or a plurality of sources 12 together create a controllable process 102.

Effectively, in accordance with the model 100, the queue occupancy value q of the queue 20 in the network element 14 is fed back into a summer 104 and is subtracted from the desired queue occupancy value T to produce an error signal e that corresponds to the error value e(n) produced by the processor circuit 46 after the completion of block 58 in FIG. 4.

This error signal e is received at a controller 106 that corresponds to the controller 26 and a portion of the drop/mark probability generator 24 that is implemented by the processor circuit 46 in executing blocks 60 and 62 in FIG. 4. In response to the received error signal e, the controller 106 generates a packet drop/mark probability signal $p_d$ corresponding to the current drop/mark probability value $p_d(n)$ produced by the processor circuit 46 after the completion of block 62 in FIG. 4. Specifically, when a packet is caused to be dropped by the controller in response to the current drop/mark probability value $p_d(n)$ according to the algorithm depicted in FIG. 5, the drop/mark probability signal $p_d$ is, in effect, communicated implicitly back to the packet sources 12 by failure to permit acknowledgement signals to be produced, which causes the sources to adjust their packet transmission rates λ. In contrast, when a packet is marked by the controller in response to the current drop/mark probability value $p_d(n)$, the drop/mark probability signal $p_d$ is communicated explicitly back to the packet sources 12 through acknowledgements carrying congestion notification messages which causes the sources to adjust their packet transmission rates. This ultimately has the effect of driving the queue occupancy level q toward convergence with the desired queue occupancy level T.

Thus, it will be appreciated that the invention provides a way to control the rate at which packets are transmitted by a source by generating a drop/mark probability value in response to queue occupancy and desired queue occupancy and by controlling packets in response to the drop/mark probability value and a reference value, which results in dropping or marking packets according to current conditions at the queue.

While specific embodiments of the invention have been described and illustrated, such embodiments should be considered illustrative of the invention only and not as limiting the invention as construed in accordance with the accompanying claims.

What is claimed is:

1. A method of controlling a rate at which packets are transmitted to a network node having a queue, the method comprising:
   a) generating a probability value in response to queue occupancy and desired queue occupancy, wherein generating comprises generating a current error value in response to said queue occupancy and said desired queue occupancy; and
   b) controlling a packet in response to said probability value and a reference value to cause a source of said packet to change its trasmission rate.

2. The method as claimed in claim 1 wherein generating said probability value comprises time filtering said current error value to produce a filtered current error value.

3. The method as claimed in claim 2 wherein time filtering comprises producing a weighted sum of present and past current error values.

4. The method as claimed in claim 3 wherein generating said probability value comprises calculating said probability value as a function of said filtered current error value and a previous probability value.

5. The method as claimed in claim 4 wherein generating said probability value further comprises weighting said filtered current error value as a function of a pre-defined control gain factor and queue capacity.

6. The method as claimed in claim 1 further comprising generating said reference value.

7. The method as claimed in claim 6 wherein generating said reference value comprises generating a random number for use as said reference value.

8. The method claimed in claim 1 wherein controlling comprises controlling admission of the packet into the queue.

9. The method as claimed in claim 8 further comprising accepting the packet into the queue when said queue occupancy is less than or equal to a minimum value.

10. The method as claimed in claim 8 further comprising generating, as a function of said probability value, an inter-drop/mark value representing a number of packets to be admitted into the queue between dropped packets, and controlling admission of packets into the queue in response to said inter-drop/mark value.

11. The method as claimed in claim 10 wherein generating said inter-drop/mark value comprises generating said inter-drop/mark value as a floor of the reciprocal of said probability value.

12. The method as claimed in claim 10 further comprising generating said reference value.

13. The method as claimed in claim 12 wherein generating said reference value comprises producing a representation of a count of packets arriving at the queue for use as said reference value.

14. The method claimed in claim 1 wherein controlling comprises modifying the packet to include a message for receipt by a sink, informing the sink of the queue status.

15. A computer readable medium for providing codes for directing a processor to:
   a) generate a probability value in response to queue occupancy and desired queue occupancy of a packet queue, wherein generating said probability value includes generating a current error value in response to said queue occupancy and said desired queue occupancy; and
   b) control a packet in response to said probability value and a reference value to cause a source of said packet to change its transmission rate.

16. A signal embodied in a carrier wave, said signal having code segments for directing a processor to control a rate at which packets are transmitted to a network node having a queue, said signal comprising:
   a) a first code segment directing said processor to generate a probability value in response to queue occupancy and desired queue occupancy, said first code segment directing said processor to generate a current error value in response to said queue occupancy and said desired queue occupancy; and
   b) a second code segment directing said processor to control a packet in response to said probability value and a reference value to cause a source of said packet to change its transmission rate.

17. An apparatus for controlling a rate at which packets are transmitted to a network node having a queue, the apparatus comprising:
   a) means for generating a probability value in response to queue occupancy and desired queue occupancy of the queue, said means being operable to generate a current error value in response to said queue occupancy and said desired queue occupancy; and
   b) means for controlling a packet in response to said probability value and a reference value to cause a source of said packet to change its transmission rate.

18. An apparatus for controlling a rate at which packets are transmitted to a network node having a queue, the apparatus comprising:
   a) a probability generator for generating a probability value in response to queue occupancy and desired occupancy, said probability generator further comprising an error value generator for generating a current error value in response to said queue occupancy and said desired occupancy; and
   b) a controller for controlling a packet in response to said probability value and a reference value, to cause a source of said packet to change its transmission rate.

19. An apparatus as claimed in claim 18 wherein said probability generator further comprises a fitter for time filtering said current error value to produce a filtered current error value.

20. An apparatus as claimed in claim 19 wherein said filter is operable to produce said filtered current error value as a weighted sum of present and past current error values.

21. An apparatus as claimed in claim 20 wherein said probability generator is operable to calculate said probability value as a function of said filtered current error value and a previous probability value.

22. An apparatus as claimed in claim 21 wherein said probability generator is operable to weight said filtered current error value as a function of a pre-defined control gain factor and queue capacity.

23. An apparatus as claimed in claim 18 further comprising a random number generator for generating a random number for use as said reference value.

24. An apparatus as claimed in claim 18 further comprising a queue occupancy value generator for generating a queue occupancy value.

25. An apparatus as claimed in claim 18 further comprising a desired occupancy value generator for generating a desired occupancy value.

26. An apparatus as claimed in claim 18 further comprising a reference value generator for generating the reference value.

27. An apparatus as claimed in claim 18 wherein said controller controls admission of said packet into the queue in response to said probability value and a reference value.

28. An apparatus as claimed in claim 27 further comprising a threshold detector for generating a threshold signal when the queue occupancy is less than or equal to a minimum value and wherein said controller is operable to admit packets into the queue in response to said threshold signal.

29. An apparatus as claimed in claim 27 further comprising a queue interface for forwarding a received packet into the queue and for discarding a received packet in response to said controller.

30. An apparatus as claimed in claim 27 further comprising an inter-drop/mark value generator, for generating as a function of said probability value, an inter-drop/mark value representing a number of packets to be accepted into said queue between dropped or marked packets, and wherein said controller is operable to control admission of packets into the queue in response to said inter-drop/mark value.

31. An apparatus as claimed in claim 30 wherein said inter-drop/mark value generator is operable to generate said inter-drop/mark value as a floor of the reciprocal of said probability value.

32. An apparatus as claimed in claim 31 further comprising a counter for producing a representation of a count of packets arriving at the queue for use as said reference value.

33. An apparatus as claimed in claim 18 wherein said controller includes a queue interface for modifying the packet to include a message for receipt by a sink, for informing the sink of queue status.

34. An apparatus for transmitting data packets between a packet source and a packet sink in a network comprising the apparatus claimed in claim 18 and further comprising:

a) a receiver for receiving a packet transmitted by the packet source; and b) a queue operable to queue the packet received at said receiver, the queue having a queue occupancy value and a desired queue occupancy value.

* * * * *